United States Patent
Karkos et al.

(10) Patent No.: US 11,268,396 B2
(45) Date of Patent: Mar. 8, 2022

(54) TURBINE FAN FAIRING PLATFORM WITH PROTECTIVE SURFACE

(71) Applicant: United Technologies Corporation, Farmington, CT (US)

(72) Inventors: Peter Karkos, Old Saybrook, CT (US); Darin S. Lussier, Guilford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 120 days.

(21) Appl. No.: 16/746,229

(22) Filed: Jan. 17, 2020

(65) Prior Publication Data
US 2021/0222576 A1 Jul. 22, 2021

(51) Int. Cl.
*F01D 11/00* (2006.01)

(52) U.S. Cl.
CPC ........ *F01D 11/008* (2013.01); *F05D 2220/32* (2013.01); *F05D 2220/36* (2013.01); *F05D 2230/60* (2013.01); *F05D 2230/90* (2013.01); *F05D 2240/55* (2013.01)

(58) Field of Classification Search
CPC .... F01D 11/005; F01D 11/006; F01D 11/008; F01D 5/288; F05D 2240/55; F05D 2230/90
See application file for complete search history.

(56) References Cited

U.S. PATENT DOCUMENTS

| | | | |
|---|---|---|---|
| 5,213,739 A * | 5/1993 | Dickerson | B29C 45/14311 156/245 |
| 6,217,283 B1 * | 4/2001 | Ravenhall | F01D 11/008 416/2 |
| 7,942,636 B2 * | 5/2011 | Evans | F01D 11/006 416/193 R |
| 9,845,699 B2 | 12/2017 | Feeney | |
| 9,976,426 B2 | 5/2018 | Turner et al. | |
| 2008/0018056 A1 * | 1/2008 | Evans | F01D 11/006 277/590 |
| 2014/0271143 A1 | 9/2014 | Feeney | |
| 2019/0112934 A1 | 4/2019 | Heeter et al. | |
| 2020/0217217 A1 * | 7/2020 | Girard | F01D 11/008 |

FOREIGN PATENT DOCUMENTS

| | | |
|---|---|---|
| EP | 1046785 A2 | 10/2000 |
| GB | 1331209 | 9/1973 |
| RU | 2698534 C1 * | 8/2019 |

OTHER PUBLICATIONS

European Search Report for European Application No. 21150602.7; Application Filing Date: Jan. 7, 2021; Date of Action: May 14, 2021; 7 pages.

* cited by examiner

*Primary Examiner* — Topaz L. Elliott
(74) *Attorney, Agent, or Firm* — Cantor Colburn LLP (57) ABSTRACT

A turbine fan fairing platform is disclosed. The turbine fan fairing platform includes a platform body including a first side portion arranged to abut a first fan blade, a second side portion arranged to abut a second fan blade, and a central portion extending between the first side portion and the second side portion. A seal member is disposed over the platform body. The seal member includes a first side portion over the platform body first side portion, a central portion over the platform body the central portion, and a second side portion over the platform body second side portion. An erosion protection layer is disposed over the seal member over the central portion of the platform body.

19 Claims, 5 Drawing Sheets

TURBINE FAN FAIRING PLATFORM WITH PROTECTIVE SURFACE

BACKGROUND

The subject matter disclosed herein relates to airfoil platforms used in gas turbine engines.

Gas turbine engines generally include a fan section, a compressor second, a combustor section, and turbine sections positioned along a centerline referred to as an "axis of rotation." The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The fan section includes a rotor assembly and a stator assembly. The stator assembly includes a fan case, which circumscribes the rotor assembly in close proximity to the tips of the rotor blades. The rotor assembly of the fan includes a rotor disk and a plurality of outwardly extending rotor blades. Each rotor blade can include an airfoil portion, a root portion, and a platform portion. The airfoil portion extends through the flow path and interacts with the working medium gases to transfer energy between the rotor blade and working medium gases. The root portion engages attachment means of the rotor disk. The platform portion engages with a fairing platform that typically extends circumferentially from the rotor blade to an adjacent rotor blade. The platform is disposed radially between the airfoil portion and the root portion.

BRIEF DESCRIPTION

A turbine fan fairing platform is disclosed. The turbine fan fairing platform includes a platform body including a first side portion arranged to abut a first fan blade, a second side portion arranged to abut a second fan blade, and a central portion extending between the first side portion and the second side portion. A seal member is disposed over the platform body. The seal member includes a first side portion over the platform body first side portion, a central portion over the platform body the central portion, and a second side portion over the platform body second side portion. An erosion protection layer is disposed over the seal member over the central portion of the platform body.

In addition to one or more of the features described above, or as an alternative to any of the foregoing embodiments, the gas turbine fan fairing platform can further include an adhesive between the platform body and the seal member.

In addition to one or more of the features described above, or as an alternative to any of the foregoing embodiments, the gas turbine fan fairing platform can further include an adhesive between the seal member and the erosion protection layer.

In addition to one or more of the features described above, or as an alternative to any of the foregoing embodiments, the seal member can include a first wing portion over the platform body first side portion extending away from the platform body, and a second wing portion over the platform body second side portion extending away from the platform.

In addition to one or more of the features described above, or as an alternative to any of the foregoing embodiments, the seal member can include a first lower portion extending along the platform body past the first wing portion, and a second lower portion extending along the platform body past the second wing portion.

In addition to one or more of the features described above, or as an alternative to any of the foregoing embodiments, the seal member can include an elastomer, and optionally can further include comprise a reinforcement member.

In addition to one or more of the features described above, or as an alternative to any of the foregoing embodiments, the erosion protection layer can include an elastomer.

In addition to one or more of the features described above, or as an alternative to any of the foregoing embodiments, the platform body can include a metal, a ceramic, a composite material comprising a matrix material and reinforcing fibers, or a combination comprising any of the foregoing.

Also disclosed is a gas turbine engine comprising a fan, a compressor, a combustor, and a turbine disposed along an air flow path, and the gas turbine fan fairing platform according to any of the foregoing embodiments.

Also disclosed is a method for making a turbine fan fairing platform. According to the method, a seal member is attached to a platform body including a first side portion arranged to abut a first fan blade, a second side portion arranged to abut a second fan blade, and a central portion extending between the first side portion and the second side portion. The seal member includes a first side portion over the platform body first side portion, a central portion over the platform body the central portion, and a second side portion over the platform body second side portion. An erosion protection layer is disposed over the seal member on the central portion of the platform body.

In addition to one or more of the features described above, or as an alternative to any of the foregoing embodiments, the method can further include forming the platform body to which the seal member is attached.

In addition to one or more of the features described above, or as an alternative to any of the foregoing embodiments, the method can further include forming the seal member by pressing an elastomer and a reinforcing member.

In addition to one or more of the features described above, or as an alternative to any of the foregoing embodiments, the method can further include disposing an adhesive between the platform body and the seal member.

In addition to one or more of the features described above, or as an alternative to any of the foregoing embodiments, the seal member used in the method can include a first wing portion over the platform body first side portion extending away from the platform body, and a second wing portion over the platform body second side portion extending away from the platform.

In addition to one or more of the features described above, or as an alternative to any of the foregoing embodiments, attaching the seal member to the platform body and disposing the erosion protection layer can be performed sequentially.

In addition to one or more of the features described above, or as an alternative to any of the foregoing embodiments, attaching the seal member to the platform body and disposing the erosion protection layer can be performed simultaneously.

In addition to one or more of the features described above, or as an alternative to any of the foregoing embodiments, attaching the seal member to the platform body, or disposing the erosion protection layer, or attaching the seal member to the platform body and disposing the erosion protection layer, can include hot bonding the seal member to the platform body, or hot bonding the erosion protection layer to the seal member, or hot bonding the seal member and the erosion protection layer together with the platform body.

In addition to one or more of the features described above, or as an alternative to any of the foregoing embodiments, disposing the erosion protection layer can include attaching a solid sheet comprising an erosion protection material to the seal member.

In addition to one or more of the features described above, or as an alternative to any of the foregoing embodiments, disposing the erosion protection layer can include disposing an adhesive between the seal member and the erosion protection layer.

In addition to one or more of the features described above, or as an alternative to any of the foregoing embodiments, disposing the erosion protection layer can include applying a fluid erosion protection material to an outer surface of the seal member, and solidifying the erosion protection material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
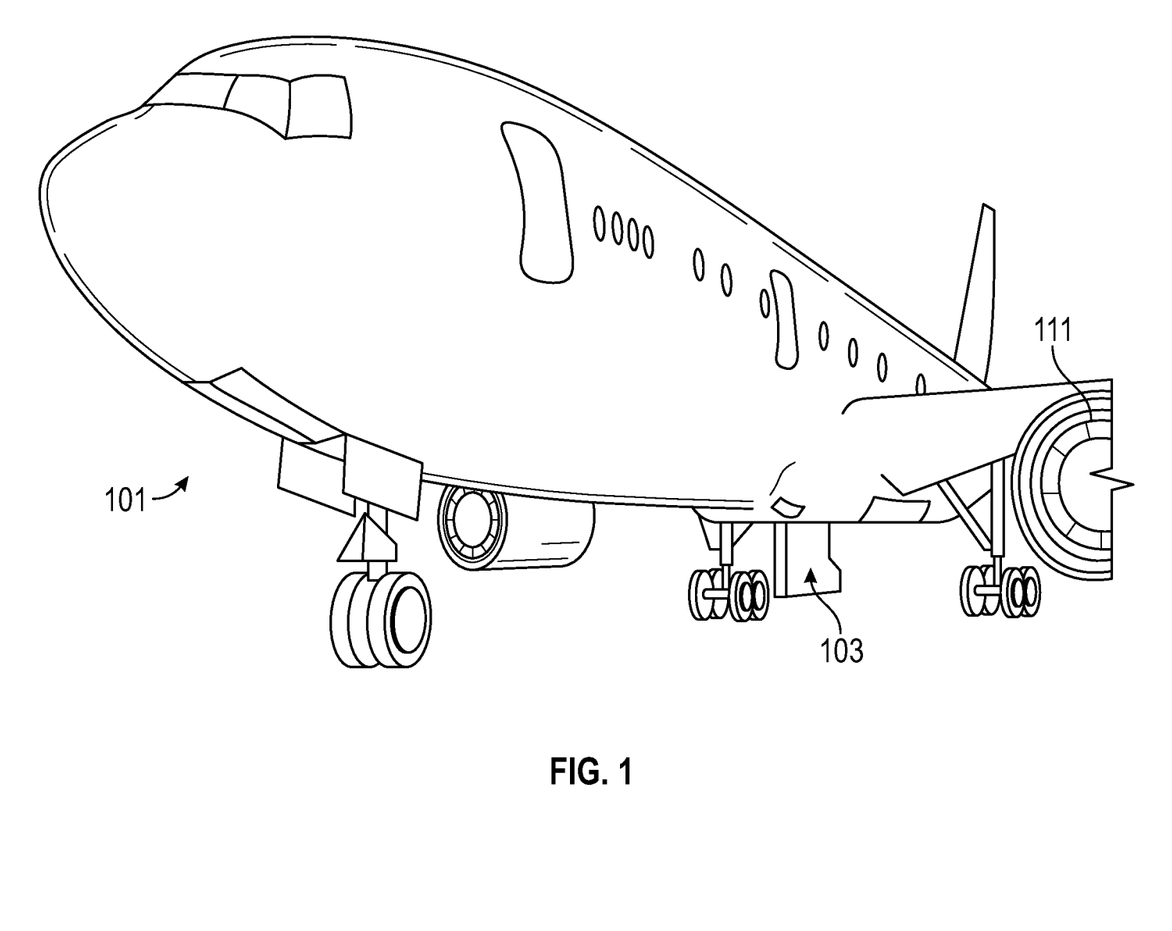
FIG. 1 is a schematic illustration of an aircraft that can incorporate various embodiments of the present disclosure.

As shown in FIG. 1, an aircraft includes an aircraft body 101, which can include one or more bays 103 beneath a center wing box. The bay 103 can contain and/or support one or more components of the aircraft 101. Also shown in FIG. 1, the aircraft includes one or more engines 111. The engines 111 are typically mounted on the wings 112 of the aircraft and are connected to fuel tanks (not shown) in the wings, but may be located at other locations depending on the specific aircraft configuration.

Figure 2:
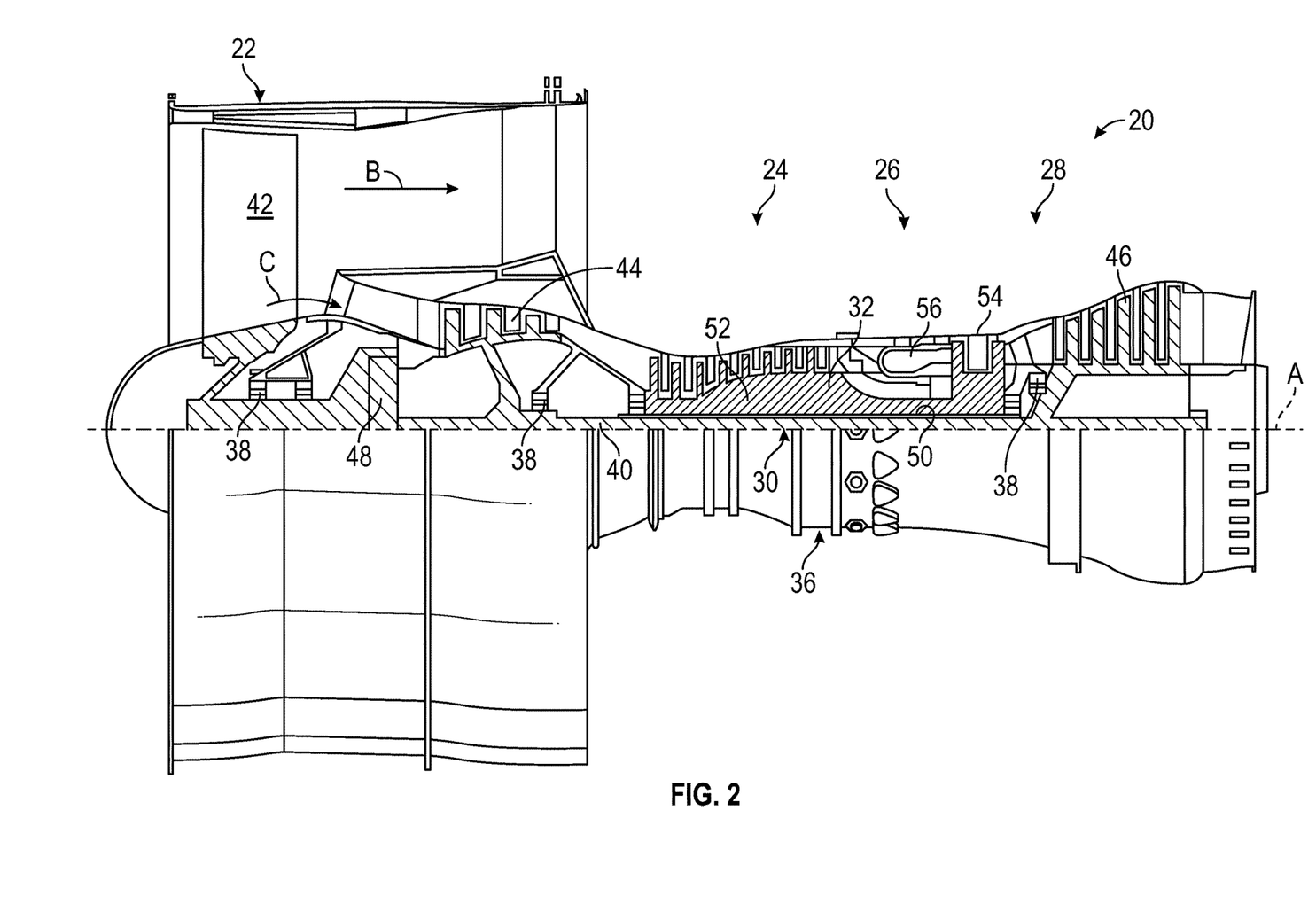
FIG. 2 is a partial cross-sectional view of a gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis. A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 3A:
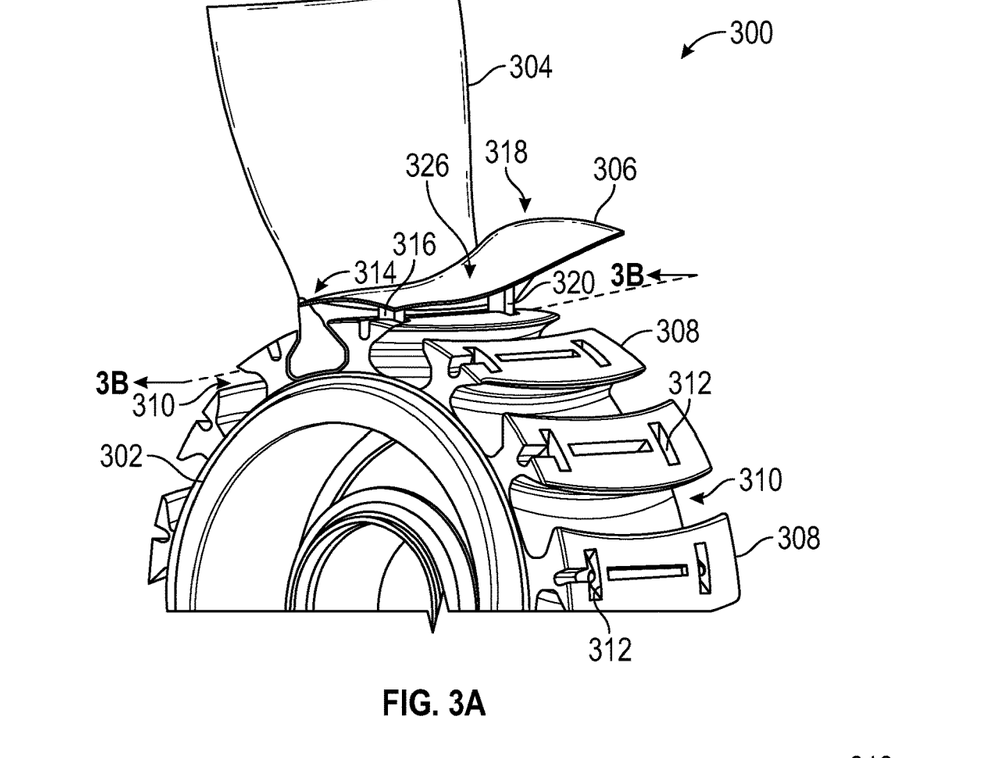
FIG. 3A is a schematic illustration of a hub assembly including a turbine fan fairing platform.
Figure 3B:
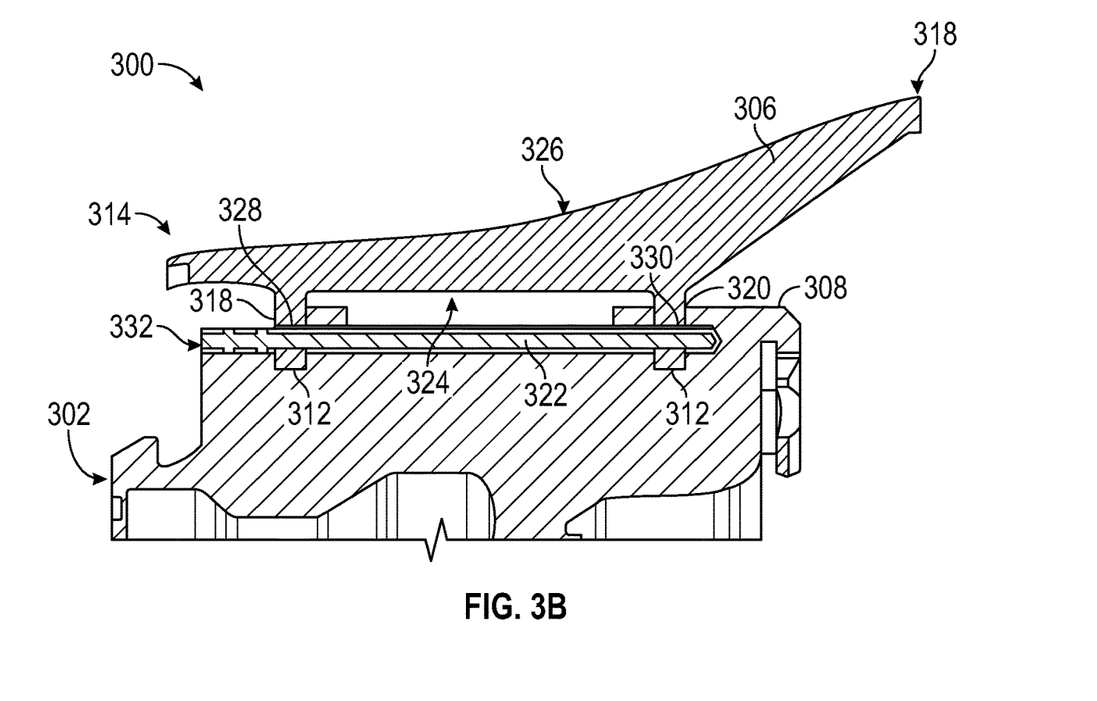
FIG. 3B is a cross-sectional illustration of a portion of the hub assembly of FIG. 3A as viewed along the line 3B-3B.

The fan section 22 can include a turbine fan fairing platform (not shown in FIG. 2) disposed between the fan blades at a radially central location near the fan hub. An example embodiment of a hub assembly 300 including a fan fairing platform is schematically shown in FIGS. 3A and 3B. FIG. 3A is an isometric illustration of the hub assembly 300 and FIG. 3B is a cross-sectional view of the hub assembly 300 as viewed along the line 3B-3B of FIG. 3A. The hub assembly 300, as shown, includes a hub 302, a fan blade 304, and a fan fairing platform 306. Although shown with a single fan blade 304 and a single platform 306, those of skill in the art will appreciate that a number of blades and platforms are to be installed to the hub 302 when installed into a gas turbine engine. Further, although a specific configuration and arrangement of elements is shown, those of skill in the art will appreciate that alternative arrangements are possible without departing from the scope of the present disclosure. That is, the present illustrations and discussion are merely for illustrative and explanatory purposes and are not intended to be limiting.

The hub assembly 300 may be installed within a fan section of a gas turbine engine. Various types of attachment mechanisms can be utilized for the platform 306, and FIGS. 3A and 3B represent an illustration of an example configuration. As shown in FIGS. 3A and 3B, the hub 302 includes at least one attachment lug 308. The fan blade 304 is installed between two adjacent attachment lug 308 within a blade cavity 310. During installation of the fan section, the platform 306 is operably coupled to each of the attachment lug 308. As shown, each of the attachment lug 308 may include one or more slots 312 that are configured to receive a portion of a respective platform 306. For example, as shown, a front end 314 of the platform 306 may include a first connector 316 that may engage within a respective slot 312, and at rear end 318 of the platform 306, a second connector 320 may engage with a respective slot 312. A locking pin 322 may be used to provide removable attachment between the platform 306 and the attachment lug 308.

The first connector 316 and the second connector 320 extend from a non-gaspath surface 324 of the platform 306, as will be appreciated by those of skill in the art. Opposite the non-gaspath surface 324 of the platform 306 is a gaspath surface 326, which may be contoured as appreciated by those of skill in the art. Each of the connectors 316, 320 include securing elements 328, 330, respectively, defining apertures for attachment. To secure the platform 306 to a respective attachment lug 308, the first connector 316 is inserted into a respective slot 312 at the front end 314 and the second connector 320 is inserted into a respective slot 312 at the rear end 318. The locking pin 322 is inserted through an attachment aperture 332 to pass through each of the securing elements 328, 330 of the platform 306 and thus through the first connector 316 and the second connector 320.

As shown in FIGS. 3A-3B, the platform 306 is a separate component of the hub-rotor assembly, with the locking pin 322 functioning as a retention feature. The sides of the platform 306 may be configured with seals to prevent air leakage, with such seals arranged at the interface or space between an edge of the platform 306 and a side of the fan blade 304. The platform 306 is configured to guide air into a core compressor inlet of a gas turbine engine, and prevent air from leaking beneath the flow surface of the platform 306. Platforms are typically made from light materials and minimal use thereof such that the platforms do not impact overall weight and/or to minimize impact if a fan blade out event occurs. Given that each rotor-blade configuration may be unique, a unique and specific platform may be required for each rotor or engine design, which may impact costs and development time thereof.

The gaspath surface 326 of the fairing platform 306 includes an erosion protection layer 92 over a fairing platform body 78 (fairing body platform 78 shown in FIGS. 4-7), and it has been discovered that attachment of the erosion protection layer directly to the platform body necessitates a separate attachment of seals at end locations of the fairing platform 306 to abut fan blades such as fan blade 304. The separate attachment of seals can require significant manufacturing resources and processing time, and can also contribute significantly to various issues such as tears and other defects at the interface between the seal and the platform body. Additionally, the surface erosion protection layers on the gaspath surface 326 can be subject to other issues when attached to a composite fairing platform body using conventional techniques such as integrated molding, such as bumpiness or discoloration. It has further been discovered that these and other issues can be addressed to provide a technical effect from the fairing platform design configurations and fabrication techniques disclosed herein. Example embodiments fairing platform design configurations and fabrication techniques are schematically shown in FIGS. 4-7.

Figure 4:
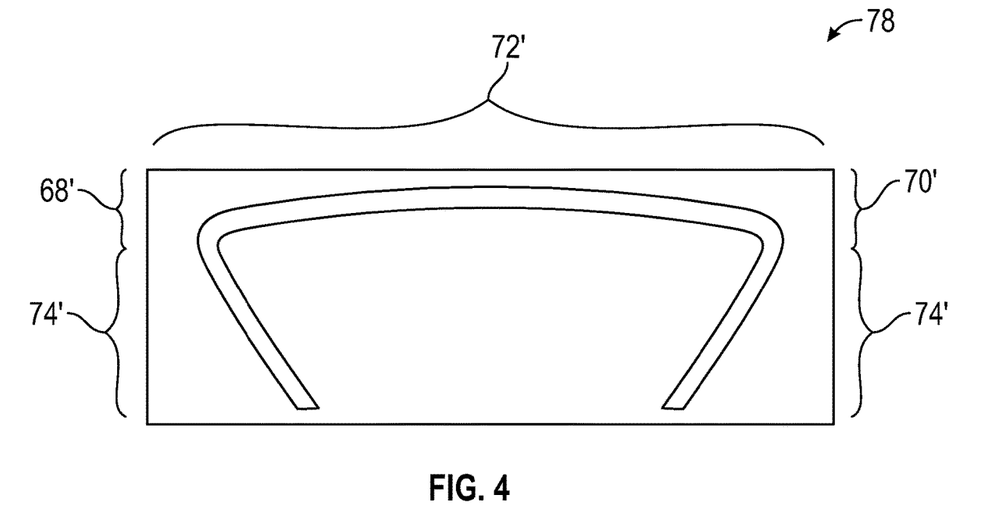
FIG. 4 is a cross-sectional view of a fairing platform body.

With reference now to FIG. 4, a cross-sectional view is shown of upper portion of an example embodiment of a fairing platform body 78. As shown in FIG. 4, the fairing platform body 78 includes side portions 68' and 70' arranged to abut adjacent fan blades, a central portion 72' arranged to deflect air radially outward from a radially inward portion of a fan assembly, and lower portion(s) 74'. The fairing platform body 78 can be made from various types of materials. Examples of materials for the fairing platform body 78 include but are not limited to fiber-resin composites, plastics, metals, ceramics, and combinations of these or other materials (either in mixtures or as structural combinations, e.g., lamination). In the case of fiber-resin composites, one way to fabricate the fairing platform body is to arrange multiple layers of a fiber fabric impregnated with a heat-curable resin such as an epoxy resin in a mold, and apply heat and pressure in the mold to form the stacked layers into the desired and to cure the resins. Alternatively, the resin can be introduced to the mold separately from the stacked fiber layers. Other molding techniques can also be used, such as injection molding a fluid blend of resin and chopped fibers. Various types of fibers can be used. Examples of fibers include but are not limited to carbon fibers, polymer fibers such as acrylamides or polyesters, ceramic fibers, metal fibers. Various types of polymer resins can be used for the polymer matrix of a composite material fairing platform body. Examples of resins include but are not limited to epoxy resins, polyurethane resins, polycarbonate resins, polyester resins, and mixtures or copolymers of these or other polymers.

Figure 5:
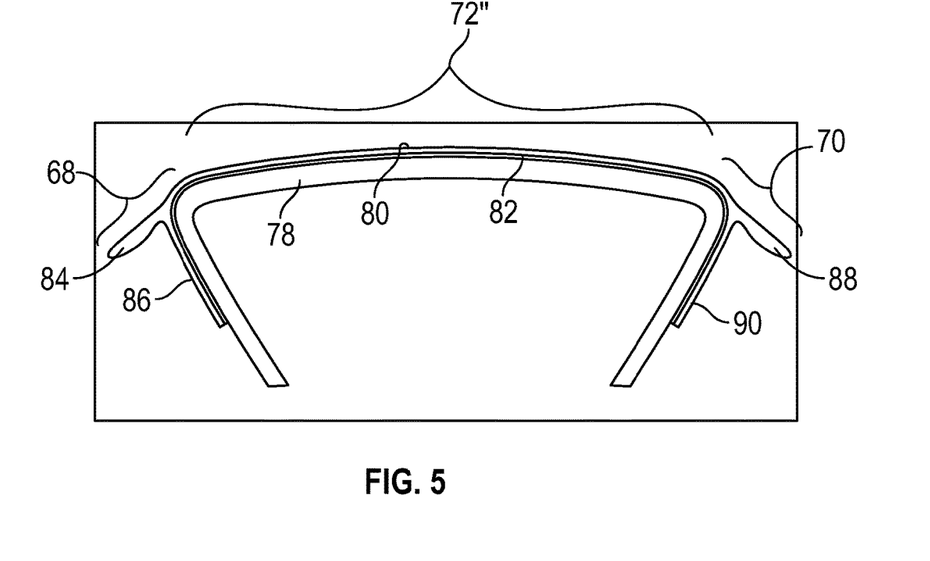
FIG. 5 is a cross-sectional view of a fairing platform body including a seal member.

FIG. 5 schematically shows attachment of a seal member 80 to the fairing platform body 78. As shown in FIG. 5, the seal member 80 includes side portions 68 and 70 over the fairing platform body side portions 68' and 70' and arranged to abut and seal against fan blades 60 (FIG. 3). The seal member also includes a central portion 72" extending between the side portions 68 and 70 over the fairing platform body central portion 72'. In some aspects, the seal member side portion can include a wing portion extending away from the fairing platform body such as the wing portions 84 and 88 that extend away from the fairing platform body 78. Such seal wing portions can provide a technical effect of promoting conformance of the seal member to a fan blade surface profile. In other aspects, other seal member surface profiles can be utilized and a wing portion is not needed. As further shown in FIG. 5, the seal member 80 can include lower portions 86 and 90 that extend along the surface of the fairing platform body 78 past the wing portions 84 and 88. The seal member 80 can include a resilient material such as an elastomeric organic polymer (i.e., elastomer) such as silicone rubber or other elastomer such as neoprene, isoprene, elastomeric fluoropolymers, etc. In some aspects, the seal member 80 can include a reinforcing member. In some aspects, the seal member 80 can include an elastomer and a reinforcing member. In other aspects, the seal member 80 can only include an elastomer. Examples of reinforcing members include, but are not limited to a fabric, web, mesh, or other arrangement of fibers. In some aspects, the seal member can include a porous reinforcing member such as a fabric or other material and an elastomer within the porous reinforcing member. In some aspects, an elastomer can be disposed both within a porous reinforcing member and on an outer surface of the reinforcing member. In some aspects, the seal member 80 can include a contiguous reinforcing member (e.g., a contiguous fabric) that extends from the side portion 68 across the central portion 72" to the side portion 70. In some aspects, the seal member 80 can be fabricated by calendering or otherwise pressing an elastomer or elastomer precursor in a fluid or gel-like state into pore spaces of a porous reinforcing member, optionally with the application of heat. In some aspects, the seal member 80 can be attached to the fairing platform body 78 by an adhesive 82, optionally augmented by application of heat and pressure such as with hot bonding (i.e., hot pressing techniques). Hot bonding is a process in which a polymer resin bonds physically (such as in the case of a thermoplastic resin) or chemically (such as in the case of a thermoset resin) with the assistance of heat. Examples of adhesive resins include epoxy, silicone, polyurethane, acrylic, or other adhesives. Alternate attachment techniques, such as positive fastening (e.g., bolts, rivets) could also be used.

Figure 6:
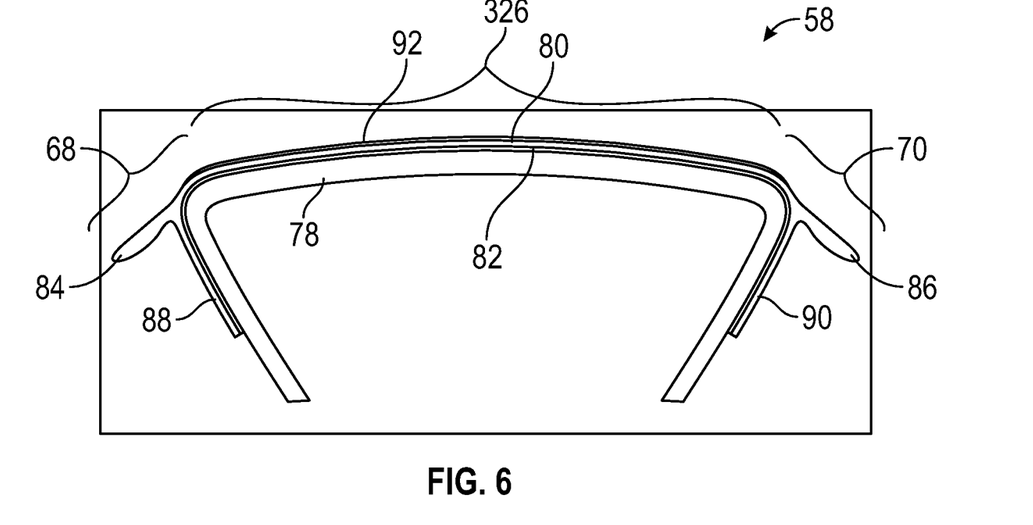
FIG. 6 is a cross-sectional view of a fairing platform body including a seal member and an erosion protection layer.
Figure 7:
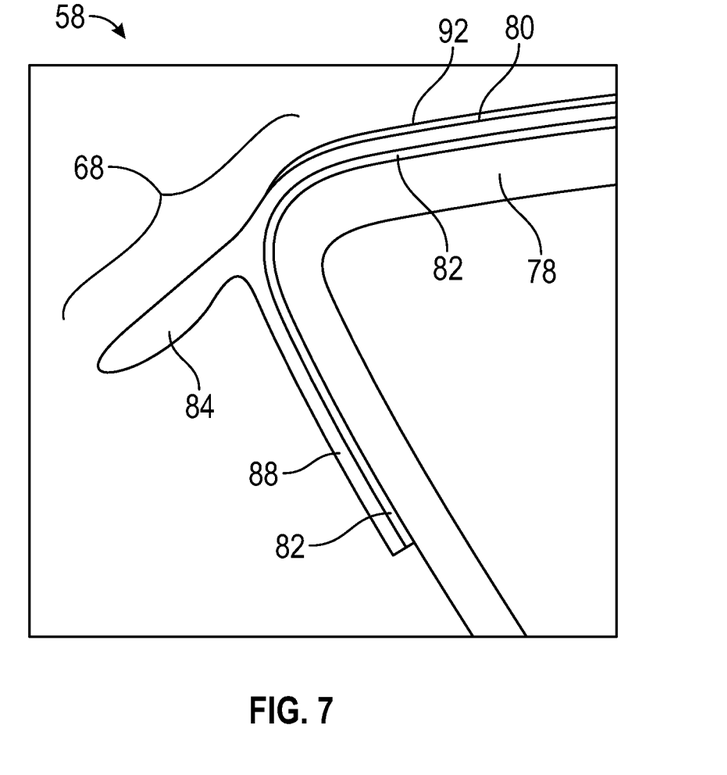
FIG. 7 is a magnified view of a portion of the fairing platform body of FIG. 6.

With reference now to FIGS. 6 and 7, an erosion protection layer 92 is shown over the central portion 72" of seal member 80. The erosion protection layer 92 also forms the gaspath surface 326 of the fairing platform 58 as shown in FIGS. 3, 6, and 7. The erosion protection layer 92 can include a material at the surface that has elastomeric material properties. In some applications, the erosion protection layer can be applied as a solid sheet and has the ability to form shape and become fluid under high pressures and temperatures before vulcanizing. In other applications, the erosion protection layer 92 can be applied as a liquid and cured (e.g., at high temperatures) to reach a solid state. In some embodiments, the erosion protection layer 92 can include an elastomeric organic polymer (i.e., elastomer) such as silicone rubber or other elastomer such as neoprene, isoprene, elastomeric fluoropolymers or copolymer (e.g., Viton™), etc. The erosion protection layer 92 can be attached or applied to the seal member 80 in various ways. For example, in some aspects a solid elastomer sheet can be attached to the seal member 80 with an adhesive or hot pressed/hot bonded to the seal member 80. The uncured elastomer can also have the ability to become viscous at higher temperatures. In other aspects, a fluid elastomer composition can be applied to the seal member 80 by spray, dispensing nozzle, roller, or other applicator. In other aspects, an elastomer from the seal member 80 can be fluidized (e.g., by application of heat) and transported to the gaspath surface 326. In other aspects, an adhesive (not shown) can be disposed between the seal member 80 and the erosion protection layer. This can be accomplished, for example, by applying heat and pressure to a seal member comprising a fluidizable elastomer in a porous fabric jacket.

It can be appreciated that, depending on the attachment or other disposition techniques used for the various components and materials of the fairing platform 58, fabrication can be accomplished in various step-wise or consolidated fabrication stages, which can provide a technical effect of promoting manufacturing efficiency. For example, in some aspects, the fairing platform 58 can be fabricated in step-wise fashion by molding the platform body 78, attaching the seal member 80 to the molded platform body 78, and attaching or disposing the erosion protection layer 92 to the seal member 80. In some aspects, one or more of these steps can be consolidated. For example, the fairing platform 58 can be fabricated by molding the platform body 78, and attaching the seal member 80 and the erosion protection layer 92 in a consolidated operation. This can be accomplished by disposing an erosion protection layer 92 (e.g., sheet of erosion protection elastomer) in a hot press with the seal member 80, adhesive 82, and the platform body 78, and then hot bonding the components together in a single operation.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine fan fairing platform, comprising:
a platform body including a first side portion arranged to abut a first fan blade, a second side portion arranged to abut a second fan blade, and a central portion extending between the first side portion and the second side portion;
a seal member over the platform body, comprising a first side portion over the platform body first side portion, a central portion over the platform body central portion, and a second side portion over the platform body second side portion; and
an erosion protection layer over the seal member over the central portion of the platform body;
wherein the erosion protection layer includes a solidified fluid erosion protection material disposed on an outer surface of the seal member.

2. The gas turbine fan fairing platform of claim 1, further comprising an adhesive between the platform body and the seal member.

3. The gas turbine fan fairing platform of claim 1, further comprising an adhesive between the seal member and the erosion protection layer.

4. The gas turbine fan fairing platform of claim 1, wherein the seal member includes a first wing portion over the platform body first side portion and extending away from the platform body, and a second wing portion over the platform body second side portion and extending away from the platform.

5. The gas turbine fan fairing platform of claim 4, wherein the seal member includes a first lower portion extending along the platform body past the first wing portion, and a second lower portion extending along the platform body past the second wing portion.

6. The gas turbine fan fairing platform of claim 1, wherein the seal member comprises an elastomer, and optionally further comprises a reinforcement member.

7. The gas turbine fan fairing platform of claim 1, wherein the erosion protection layer comprises an elastomer.

8. The gas turbine fan fairing platform of claim 1, wherein the platform body comprises a metal, a ceramic, a composite material comprising a matrix material and reinforcing fibers, or a combination comprising any of the foregoing.

9. A gas turbine engine comprising a fan, a compressor, a combustor, and a turbine disposed along an air flow path, and the gas turbine fan fairing platform of claim 1 between fan blades of the fan.

10. A method of making a gas turbine fan fairing platform, comprising:
attaching a seal member to a platform body including a first side portion arranged to abut a first fan blade, a second side portion arranged to abut a second fan blade, and a central portion extending between the first side portion and the second side portion, said seal member comprising a first side portion over the platform body first side portion, a central portion over the platform body central portion, and a second side portion over the platform body second side portion; and
disposing an erosion protection layer over the seal member on the central portion of the platform body;
wherein disposing the erosion protection layer includes applying a fluid erosion protection material to an outer surface of the seal member, and solidifying the erosion protection material.

11. The method of claim 10, further comprising forming the platform body to which the seal member is attached.

12. The method of claim 11, further comprising forming the seal member by pressing an elastomer and a reinforcing member.

13. The method of claim 10, further comprising disposing an adhesive between the platform body and the seal member.

14. The method of claim 10, wherein the seal member includes a first wing portion over the platform body first side portion extending away from the platform body, and a second wing portion over the platform body second side portion extending away from the platform.

15. The method of claim 10, wherein attaching the seal member to the platform body and disposing the erosion protection layer are performed sequentially.

16. The method of claim 10, wherein attaching the seal member to the platform body and disposing the erosion protection layer are performed simultaneously.

17. The method of claim 10, wherein attaching the seal member to the platform body, or disposing the erosion protection layer, or attaching the seal member to the platform body and disposing the erosion protection layer, includes hot bonding the seal member to the platform body, or hot bonding the erosion protection layer to the seal member, or hot bonding the seal member and the erosion protection layer together with the platform body.

18. The method of claim 10, wherein disposing the erosion protection layer includes attaching the erosion protection material to the seal member.

19. The method of claim 10, disposing the erosion protection layer includes disposing an adhesive between the seal member and the erosion protection layer.

* * * * *